US012315904B2

United States Patent
Obasih et al.

(10) Patent No.: US 12,315,904 B2
(45) Date of Patent: May 27, 2025

(54) BATTERY SYSTEM HAVING A PASSIVE HEAT SINK

(71) Applicants: CPS Technology Holdings LLC, New York, NY (US); Clarios Advanced Solutions GmbH, Hannover (DE)

(72) Inventors: Kem M. Obasih, Brookfield, WI (US); Richard M. DeKeuster, Racine, WI (US); Daniel B. Le, Grafton, WI (US); Xugang Zhang, Shorewood, WI (US); Christian Kuper, Barsinghausen (DE); Nicholas E Elison, Mequon, WI (US); Jason D. Fuhr, Sussex, WI (US)

(73) Assignees: CPS Technology Holdings LLC, New York, NY (US); Clarios Advanced Solutions GmbH, Hannover (DE)

( * ) Notice: Subject to any disclaimer, the term of this patent is extended or adjusted under 35 U.S.C. 154(b) by 866 days.

(21) Appl. No.: 17/428,576

(22) PCT Filed: Feb. 7, 2020

(86) PCT No.: PCT/US2020/017125
§ 371 (c)(1),
(2) Date: Aug. 4, 2021

(87) PCT Pub. No.: WO2020/163665
PCT Pub. Date: Aug. 13, 2020

(65) Prior Publication Data
US 2022/0109200 A1 Apr. 7, 2022

Related U.S. Application Data

(60) Provisional application No. 62/803,026, filed on Feb. 8, 2019.

(51) Int. Cl.
*H01M 10/6554* (2014.01)
*H01M 10/625* (2014.01)
(Continued)

(52) U.S. Cl.
CPC ..... *H01M 10/6554* (2015.04); *H01M 10/625* (2015.04); *H01M 50/204* (2021.01);
(Continued)

(58) Field of Classification Search
CPC .......... H01M 10/6554; H01M 10/625; H01M 10/615; H01M 10/6235; H01M 10/627;
(Continued)

(56) References Cited

U.S. PATENT DOCUMENTS

2012/0021260 A1* 1/2012 Yasui ................. H01M 10/615
429/71
2014/0186669 A1* 7/2014 Obasih ............... H01M 10/655
29/623.5
(Continued)

FOREIGN PATENT DOCUMENTS

CN 102356504 A 2/2012
CN 105009321 A 10/2015
(Continued)

OTHER PUBLICATIONS

International Search Report and Written Opinion of the International Searching Authority dated May 19, 2020 for PCT/US2020/017125 filed Feb. 7, 2020, 101 pages.

*Primary Examiner* — Matthew W Van Oudenaren
(74) *Attorney, Agent, or Firm* — Boardman & Clark LLP

(57) ABSTRACT

A battery system having a housing configured to receive a battery cell that is configured to generate thermal energy. The housing includes a first wall and a second wall, both of which are positioned proximate to the battery cell. The first wall and the second wall form in part a cell compartment. The battery system further includes a unitary heat sink having a first portion embedded into the first wall and a second portion embedded into the second wall.

15 Claims, 8 Drawing Sheets

(51) Int. Cl.
*H01M 50/204* (2021.01)
*H01M 50/209* (2021.01)
*H01M 50/227* (2021.01)
*H01M 50/278* (2021.01)
*H01M 50/296* (2021.01)

(52) U.S. Cl.
CPC ....... *H01M 50/209* (2021.01); *H01M 50/227* (2021.01); *H01M 50/278* (2021.01); *H01M 50/296* (2021.01)

(58) Field of Classification Search
CPC ........... H01M 10/647; H01M 10/6551; H01M 10/6555; H01M 50/204; H01M 50/209; H01M 50/227; H01M 50/278; H01M 50/296; H01M 50/231; H01M 50/289; H01M 50/291; H01M 50/293
See application file for complete search history.

(56) References Cited

U.S. PATENT DOCUMENTS

2014/0272517 A1   9/2014   Glasgow
2016/0093932 A1*  3/2016   Obasih ................ H01M 10/613
                                                 429/120

FOREIGN PATENT DOCUMENTS

| CN | 105390769 A  |   | 3/2016  |
|----|--------------|---|---------|
| CN | 106030231 A  |   | 10/2016 |
| CN | 107004794 A  |   | 8/2017  |
| CN | 206921972 U  |   | 1/2018  |
| CN | 2069219272   | * | 1/2018  |
| CN | 107801422 A  |   | 3/2018  |
| CN | 108735936 A  |   | 11/2018 |
| WO | 2014057754 A1|   | 4/2014  |

* cited by examiner

BATTERY SYSTEM HAVING A PASSIVE HEAT SINK

CROSS-REFERENCE TO RELATED APPLICATIONS

This application is a national phase filing of International Patent Application No. PCT/US2020/017125 entitled "Battery System Having a Passive Heat Sink," which has an international filing date of Feb. 7, 2020, and claims the benefit of U.S. Provisional Patent Application No. 62/803,026, filed on Feb. 8, 2019, entitled "Enhanced Passive Management System for Li-Ion Battery, the entire content of each of which is incorporated herein by reference for all purposes.

FIELD

The disclosure relates generally to the field of batteries and battery modules and their uses thereof. More specifically, the disclosure relates to a battery module have a thermal management system with a heat sink.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48-Volt (V) or 130V systems.

The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved battery module components that are used in xEVs. For instance, battery modules include one or more battery cells that generate thermal energy (e.g., heat), which may increase a temperature within a housing of the battery module. Existing battery modules may include various features that transfer thermal energy to a cooling fluid, or to a surrounding environment of the battery module. Unfortunately, existing features may be inefficient at removing thermal energy from the battery module and/or may be expensive and complex to incorporate into the battery module.

SUMMARY

Some embodiments of the invention generally relate to features that improve heat dissipation from within a battery module housing.

According to one aspect, a battery system is disclosed. The battery system includes a housing configured to receive a battery cell that is configured to generate thermal energy. The housing includes a first wall and a second wall, both of which are positioned proximate to the battery cell. The first wall and the second wall form in part a cell compartment. The battery system further includes a unitary heat sink having a first portion embedded into the first wall and a second portion embedded into the second wall.

According to another aspect, a second battery system is disclosed. The second battery system includes a plurality of battery cells that are configured to generate thermal energy, and a housing for the plurality of battery cells. The housing includes a first wall and a second wall positioned orthogonally to one another. The first and second walls are proximate to the plurality of battery cells. The first wall and the second wall form in part a cell compartment. The second battery system further includes a unitary heat sink having a first portion and a second portion. The first portion is completely embedded into the first wall, and the second portion is partially embedded into the second wall. The second portion includes a partially exposed surface to the cell compartment. The second battery system also includes a thermal epoxy fixedly coupling the plurality of battery cells to the partially exposed surface.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

Figure 1:
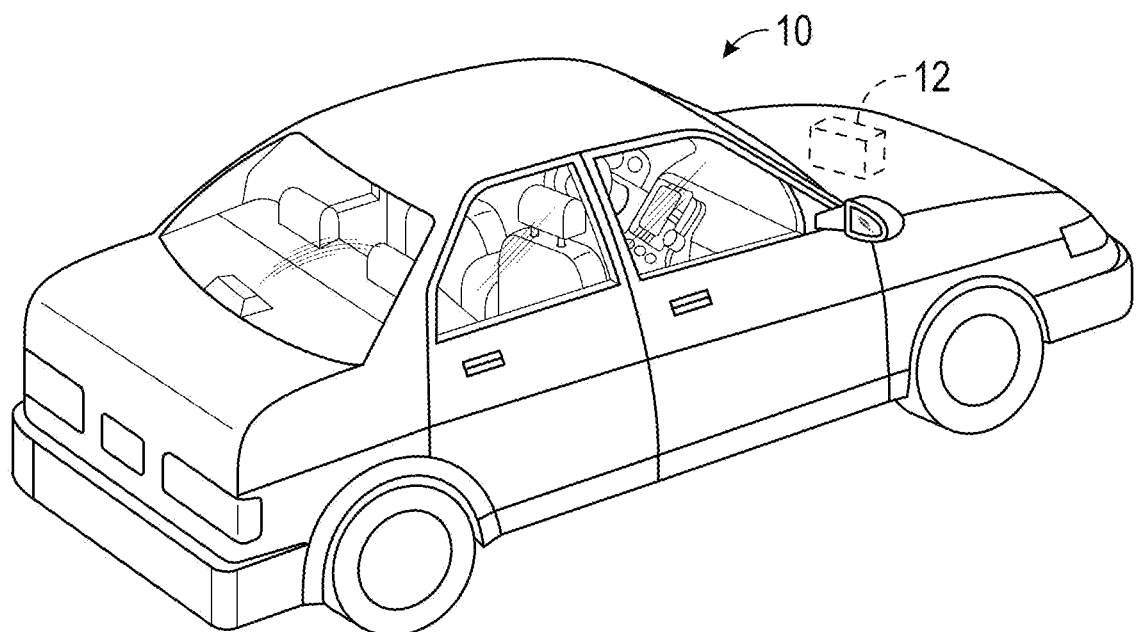
FIG. 1 is perspective view of a vehicle (e.g., an xEV) having a battery system contributing all or a portion of the power for the vehicle.

It should be understood that the drawings are not necessarily to scale. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the embodiments illustrated herein.

DETAILED DESCRIPTION

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with described constructions may be incorporated with or provide power to stationary power systems (e.g., non-automotive systems).

Various battery systems described herein disclose a battery module housing that is configured to improve dissipation of thermal energy (e.g., heat) generated by one or more battery cells positioned within the battery module housing. Some constructions are directed to lithium-ion battery modules that may be used in vehicular contexts (e.g., hybrid electric vehicles) as well as other energy storage/expending applications (e.g., energy storage for an electrical grid).

Based on the advantages over traditional gas-power vehicles, manufacturers, which generally produce traditional gas-powered vehicles, may desire to utilize improved vehicle technologies (e.g., regenerative braking technology) within their vehicle lines. Often, these manufacturers may utilize one of their traditional vehicle platforms as a starting point. Accordingly, since traditional gas-powered vehicles are designed to utilize 12V battery systems, a 12V lithium-ion battery may be used to supplement a 12V lead-acid battery. More specifically, the 12V lithium-ion battery may be used to more efficiently capture electrical energy generated during regenerative braking, for example, and subsequently supply electrical energy to power the vehicle's electrical system.

As advancements occur with vehicle technologies, high voltage electrical devices requiring voltage higher than 12V may also be included in the vehicle's electrical system. For example, the lithium-ion battery may supply electrical energy to an electric motor in a mild- or micro-hybrid vehicle. Often, these higher voltage electrical devices utilize voltage greater than 12V, for example, 48V. Accordingly, in some implementations, the output voltage of a 12V lithium-ion battery may be boosted using a DC-DC converter to supply power to the high voltage devices. Additionally or alternatively, a 48V lithium-ion battery may be used to supplement a 12V lead-acid battery. More specifically, the 48V lithium-ion battery may be used to more efficiently capture electrical energy generated during regenerative braking and subsequently supply electrical energy to power the high voltage devices.

Thus, the design choice regarding whether to utilize a 12V lithium-ion battery or a 48V lithium-ion battery, for example, may depend directly on the electrical devices included in a vehicle. Nevertheless, although the voltage characteristics may differ, the operational principles of a 12V lithium-ion battery and a 48V lithium-ion battery are generally similar. More specifically, as described above, both may be used to capture electrical energy during regenerative braking and subsequently supply electrical energy to power electrical devices in the vehicle.

Accordingly, to simplify the following discussion, the present techniques will be described in relation to a battery system with a 12V lithium-ion battery and a 12V lead-acid battery. However, one of ordinary skill in art is able to adapt the present techniques to other battery systems, such as a battery system with a 48V lithium-ion battery and a 12V lead-acid battery.

With the preceding in mind, described herein are battery module housings that can increase dissipation of thermal energy (e.g., heat) from within the battery module housing. As set forth above, one or more battery cells disposed within the battery module housing generate thermal energy as a result of chemical reactions that ultimately create electrical energy, which may be supplied to a load (e.g., a vehicle). The thermal energy increases a temperature within the battery module housing. In some cases, the increased temperature may affect operation of various components (e.g., the battery cells and/or electrical components) within the housing. One or more embodiments of the present disclosure are related to features of a battery module housing that enhance the dissipation of thermal energy generated within the battery module housing. More specifically, one ore more embodiments of the present disclosure are directed to arrangements in which the battery cells are attached to a heat spreading metal embedded inside the housing packets, which uses the housing external surfaces as heat transfer to the ambient air.

In at least one known configuration, the battery cells of a lithium-ion battery are thermally heat sunk to the heat sinks at the bottom of the housing. The heat generated in the cells is conducted through the thermal interface material between the cell can (or housing) and a heat sink. The heat is then conducted from the heat sink to the housing to use the housing outside surface to reject the heat out to the ambient air. Such an approach can be inefficient because the heat sink may have a relatively small heat transfer area, while the housing has a large heat transfer area but poor thermal conductivity. Hence, this can produce higher temperatures due to the large thermal resistance in the housing.

Alternatively, in at least one construction described below, the heat sink at the bottom of the battery housing is extended into an L-shaped heat sink embedded by a larger extent into the housing. This configuration allows the heat to be further conducted into a large surface area section of the battery housing, thereby reducing the thermal resistance of the battery module which results to lower temperatures for the heat dissipation load.

The heat sink constructions of the present disclosure may also be used in combination with a grid of fins of a battery module housing that increase an amount of thermal dissipation through natural convection (e.g., passive transfer of thermal energy). Such a configuration for the battery module may allow enhanced heat dissipation relative to existing designs. In some constructions, the fins may include channels or grooves that facilitate a flow of air between openings formed by the fins and/or between the fins and a surrounding environment. Further, the fins may contact a heat sink (e.g., a steel plate, a chassis of a vehicle) that absorbs thermal energy from the fins and further enhances thermal energy dissipation.

To help illustrate, FIG. 1 is a perspective view of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles. Further and as already discussed above, the techniques described herein are adaptable to other non-vehicle and/or other energy storage/expending applications (e.g., energy storage for an electrical grid).

As discussed, it may be desirable for a battery system 12 to be largely compatible with traditional vehicle designs. Accordingly, the battery system 12 may be placed in a location in the vehicle 10 that would have housed a traditional battery system. For example, as depicted, the vehicle 10 may include the battery system 12 positioned like a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some implementations, positioning a battery system 12 under the hood of the vehicle 10 may enable an air duct to channel airflow over the battery system 12 and cool the battery system 12.

Figure 2:
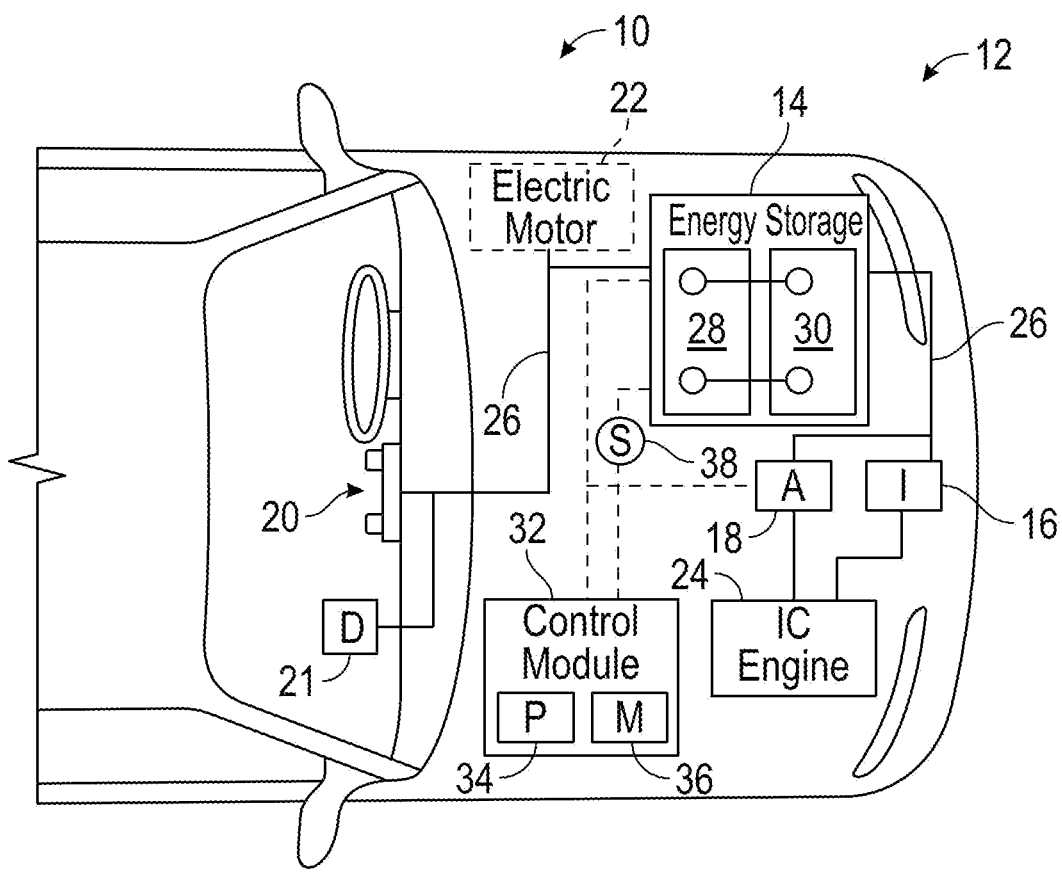
FIG. 2 is a cutaway schematic view of the vehicle of FIG. 1.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. In the depicted illustration, the energy storage component 14 supplies power to the vehicle console 20, a display 21 within the vehicle, and the ignition system 16, which may be used to start (e.g., crank) an internal combustion engine 24.

Additionally, the energy storage component 14 may capture electrical energy generated by the alternator 18 and/or the electric motor 22. In some constructions, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some constructions, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12V battery system 12 is used, the bus 26 may carry electrical power typically between 8V-18V.

Additionally, as depicted, the energy storage component 14 may include multiple battery modules. For example, the energy storage component 14 includes a lead acid (e.g., a first) battery module 28, and a lithium ion (e.g., a second) battery module 30, where each battery module 28, 30 includes one or more battery cells. In other implementations, the energy storage component 14 may include any number of battery modules. Additionally, although the first battery module 28 and the second battery module 30 are depicted adjacent to one another, they may be positioned in different areas around the vehicle. For example, the second battery module 30 may be positioned in or about the interior of the vehicle 10 while the first battery module 28 may be positioned under the hood of the vehicle 10.

In some constructions, the energy storage component 14 may include multiple battery modules to utilize multiple different battery chemistries. For example, the first battery module 28 may utilize a lead-acid battery chemistry and the second battery module 30 may utilize a lithium ion battery chemistry. In such an implementation, the performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, determine a predicted temperature trajectory of either battery module 28 and 30, determine predicted life span of either battery module 28 or 30, determine fuel economy contribution by either battery module 28 or 30, determine an effective resistance of each battery module 28 or 30, control magnitude of voltage or current output by the alternator 18 and/or the electric motor 22, and the like.

Accordingly, the control module (e.g., unit) 32 may include one or more processors 34 and one or more memories 36. More specifically, the one or more processors 34 may include one or more application specific integrated circuits (ASICs), one or more field programmable gate arrays (FPGAs), one or more general purpose processors, or any combination thereof. Generally, the processor 34 may perform computer-readable instructions related to the processes described herein. Additionally, the processor 34 may be a fixed-point processor or a floating-point processor.

Additionally, the one or more memories 36 may include volatile memory, such as random access memory (RAM), and/or non-volatile memory, such as read-only memory (ROM), optical drives, hard disc drives, or solid-state drives. In some constructions, the control module 32 may include portions of a vehicle control unit (VCU) and/or a separate battery control module. Additionally, as depicted, the control module 32 may be included separate from the energy storage component 14, such as a standalone module. In other embodiments, the battery management system (BMS) may be included within the energy storage component 14.

In certain implementations, the control module 32 or the processor 34 may receive data from various sensors 38 disposed within and/or around the energy storage component 14. The sensors 38 may include a variety of sensors for measuring current, voltage, temperature, and the like regarding the battery module 28 or 30. After receiving data from the sensors 38, the processor 34 may convert raw data into estimations of parameters of the battery modules 28 and 30. As such, the processor 34 may render the raw data into data that may provide an operator of the vehicle 10 with valuable information pertaining to operations of the battery system 12, and the information pertaining to the operations of the battery system 12 may be displayed on the display 21. The display 21 may display various images generated by device 10, such as a GUI for an operating system or image data (including still images and video data). The display 21 may be any suitable type of display, such as a liquid crystal display (LCD), plasma display, or an organic light emitting diode (OLED) display, for example. Additionally, the display 21 may include a touch-sensitive element that may provide inputs to the adjust parameters of the control module 32 or data processed by the processor 34.

The energy storage component 14 may have dimensions comparable to those of a typical lead-acid battery to limit modifications to the vehicle 10 design to accommodate the battery system 12. For example, the energy storage component 14 may be of similar dimensions to an H6 battery, which may be approximately 13.9 inches×6.8 inches×7.5 inches. As depicted, the energy storage component 14 may be included within a single continuous housing. In other constructions, the energy storage component 14 may include multiple housings coupled together (e.g., a first housing including the first battery 28 and a second housing including the second battery 30). In still other constructions, as mentioned above, the energy storage component 14 may include the first battery module 28 located under the hood of the vehicle 10, and the second battery module 30 may be located within the interior of the vehicle 10.

Figure 3:
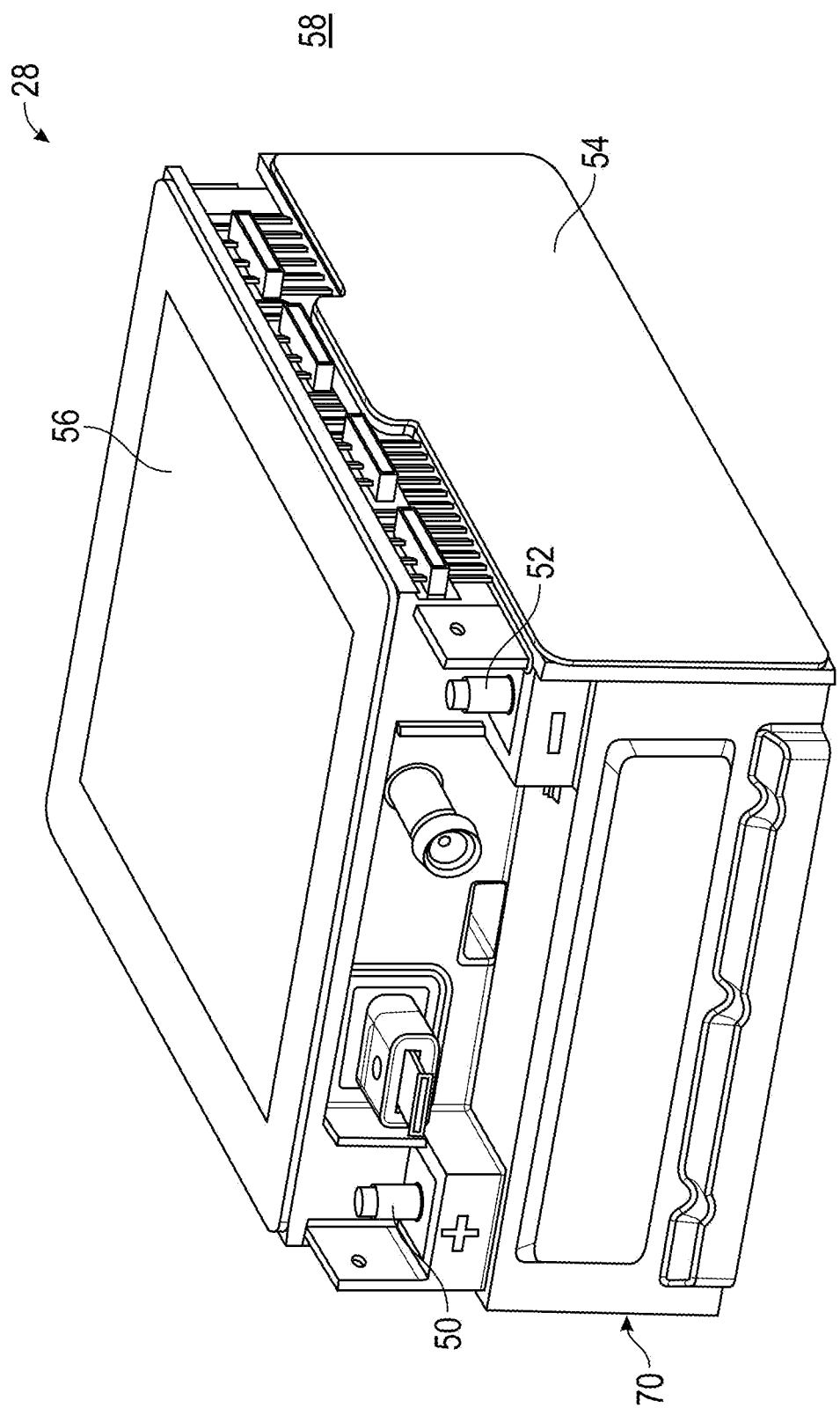
FIG. 3 is a perspective view of a lithium ion battery module capable of being used in the vehicle of FIG. 1.

FIG. 3 is a perspective view of a battery 28 that includes a first battery module terminal 50 and a second battery module terminal 52. The battery module terminals 50, 52 are disposed on a battery module housing 54 and are electrically coupled to one or more battery cells disposed within a cavity of the housing 54. As such, a load or a power supply may be coupled to the battery module terminals 50, 52, such that the battery 28 supplies and/or receives electrical power. As shown in FIG. 3, the cavity of the housing 54 is sealed via a cover 56. In some constructions, the cover 56 is secured to the housing 54 via a weld (e.g., a laser weld), fasteners, another suitable technique, or a combination thereof. In any case, the cavity of the housing is substantially sealed (e.g., air-tight or water-tight) to block gases or fluids within the housing 54 from leaking into an environment 58 surrounding the battery 28 and/or to block water or other contaminants from entering into the housing 54 from the environment 58 surrounding the battery 28. In some constructions, the battery module housing 54 and/or the cover 56 may include a polymeric material, such as polypropylene. However, in other constructions, the battery module housing 54 and/or the cover 56 may include any suitable material.

One or more battery cells disposed within the cavity of the housing 54 generate thermal energy to produce electrical energy, which is ultimately supplied to a load via the battery module terminals 50, 52. Various constructions described herein are directed to an improved thermal energy management system 70 that increases an amount of thermal energy dissipation from within the battery module housing 54.

Figure 4:
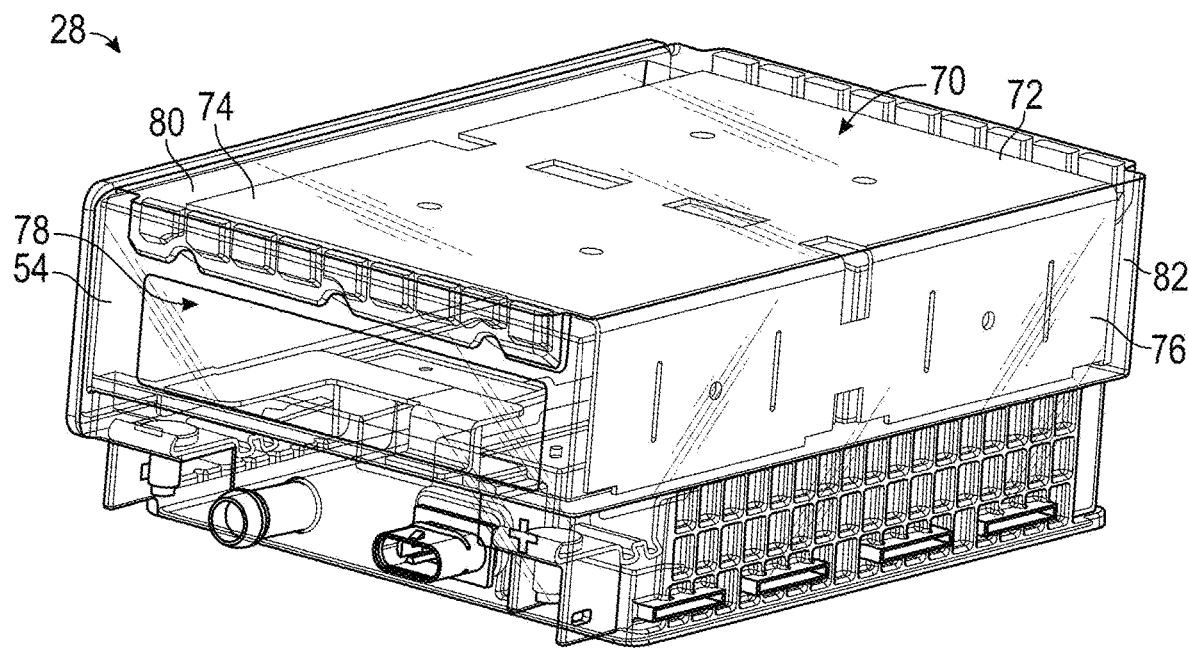
FIG. 4 is a perspective see-through view of a thermal management system capable of being used in the battery module of FIG. 3.

For example, FIG. 4 is a perspective see-through view of a battery module 28 and depicting elements of the thermal energy management system 70. As shown in FIG. 4, the thermal energy management system 70 includes a heat sink 72 integrated into the housing 54 of the battery module 28. More specifically, in at least one construction, the heat sink 72 may be integrated into the housing 54 as an over-molded part.

The heat sink 72 may be constructed from any appropriate material that has a thermal conductivity higher than the material forming the battery module housing 54. By way of non-limiting example, the heat sink 72 may be formed from aluminum, steel, and so forth, and the battery module housing 54 may be formed from a polymer or polymer composite, such as a polyolefin (e.g., polypropylene) or polyolefin composite, or any suitable polymeric material (e.g., polymer mixtures).

As shown, the heat sink 72 includes a first portion 74 and a second portion 76. The first and second portions 74, 76 of the heat sink 72 are oriented crosswise (e.g., transverse, orthogonally) relative to one another to allow the battery module housing 54 to experience heat transfer from at least two portions of a cell compartment 78 defined by internal surfaces of the battery module housing 54. In particular, the cell compartment 78 is configured to house battery cells of the battery module 28, and the heat sink 72, having an "L"-shape as illustrated, allows thermal energy to be more readily transferred away from the cells.

In the illustration of FIG. 4, the heat sink 72 is completely over molded by the battery module housing 54. That is, the heat sink 72 has no surfaces that are exposed to the external environment surrounding the battery module 28, and no surfaces that are exposed to the internal environment enclosed by the battery module 28. Indeed, completely embedding the heat sink 72 into the battery module housing 54 allows the heat sink 72 to be integrated without the formation of a possible leak path. In the illustration, the first portion 74 of the heat sink 72 is completely embedded within a first wall 80 of the housing 54, for example defining all or a portion of a side (e.g., a bottom side) of the housing 54. The second portion 76 of the heat sink 72 is completely embedded behind a second wall 82 of the housing 54, for example defining all or a portion of another side (e.g., a rear side) of the housing 54. The first and second walls 80, 82 may generally correspond to the region defining the cell compartment 78 of the housing 54.

While the heat sink 72 is shown as being completely embedded within the housing 54, in other implementations, the heat sink 72 may have certain surfaces that are exposed to the internal environment or the external environment. In such constructions, additional processing of the heat sink 72 may be performed to provide a more robust physical connection between the heat sink 72 and the housing 54. For instance, the heat sink 72 may undergo surface roughening to allow for a more robust connection to the polymeric material forming the housing 54. As an example, the heat sink 72 may have an exposed surface on the interior of the battery module housing 54 that allows for rapid thermal energy transfer away from the battery cells. For example, one alternative construction will be discussed in more detail in FIGS. 10-12.

Figure 5:
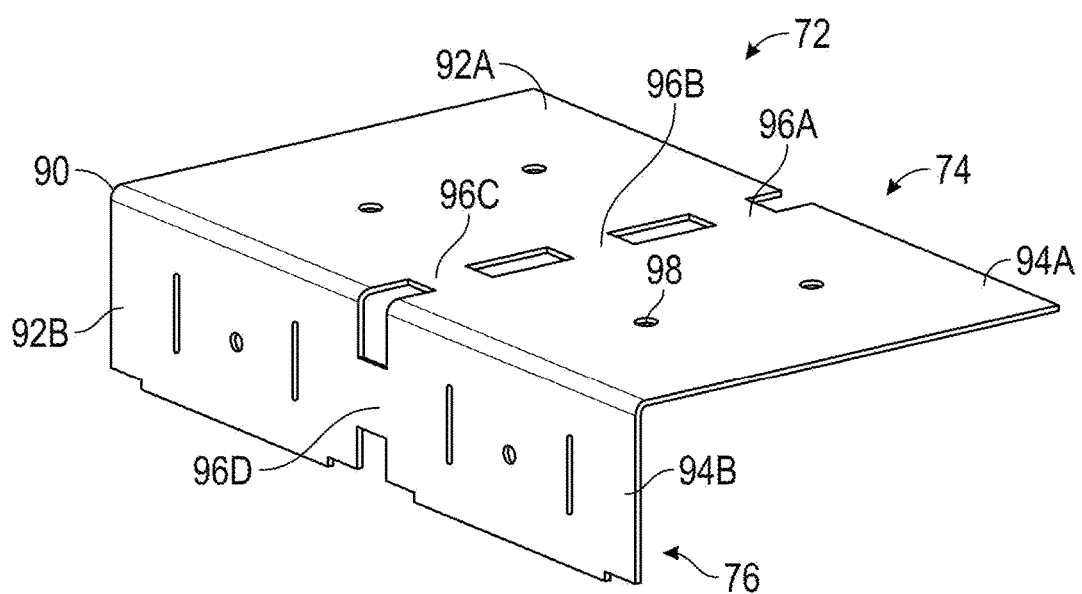
FIG. 5 is a perspective view of a heat sink capable of being used in the battery module of FIG. 4.

The configuration of the heat sink 72 may be further appreciated with respect to FIG. 5, which is a perspective view of the heat sink 72 removed from the battery module 28. In the illustration, the heat sink 72 has the L-shape shown in FIG. 4, with the first portion 74 and the second portion 76 being oriented crosswise relative to one another.

A transition region 90 between the first and second portions 74, 76 is illustrated as a curved, rather than angled surface. Such a configuration for the transition region 90 may be desirable to avoid the presence of edges or ridges, which may act as thermal energy concentrators that may result in "hot spots" of the battery module 28. However, in certain constructions, the transition region 90 may simply be an angled or beveled surface.

As also illustrated in FIG. 5, the first portion 74 and the second portion 76 have adjacent sections configured to correspond to different stacks of battery cells within the module 28. In particular, the first portion 74 of the heat sink 72 has a respective first cell section 92A and a respective second cell section 94A, and the second portion 76 of the heat sink 72 has a respective first cell section 92B and a respective second cell section 94B. The respective first and second cell sections 92A, 94A of the first portion 74 of the heat sink 72 are configured to generally align with (e.g., be in a parallel plane with) faces of the battery cells. The respective first and second cell sections 92B, 94B of the second portion 76 of the heat sink 72 are configured to generally align with (e.g., be in a parallel plane with) base ends of the battery cells. Such configurations are described in further detail below with respect to FIG. 7.

In the illustrated embodiment of FIG. 5, the heat sink 72 includes the first and second cell sections 92, 94 and a plurality of bridges 96 extending between the first and second cell sections 92, 94 (illustrated as a first, second, third, and fourth bridge 96A, 96B, 96C, 96D). The plurality of bridges 96 are configured to thermally couple first and second cell sections 92, 94, but are discontinuous sections of the heat sink 72. Such discontinuity may be desirable to reduce material requirements for the heat sink 72, and to facilitate integration of the heat sink 72 into the housing 54. For example, smaller sections of the heat sink material may be easier to integrate into the housing 54 when the housing 54 is overmolded. Indeed, the heat sink 72 may also include a plurality of holes 98 to facilitate attachment of the heat sink 72 to a mold in which the housing 54 is formed.

Figure 6:
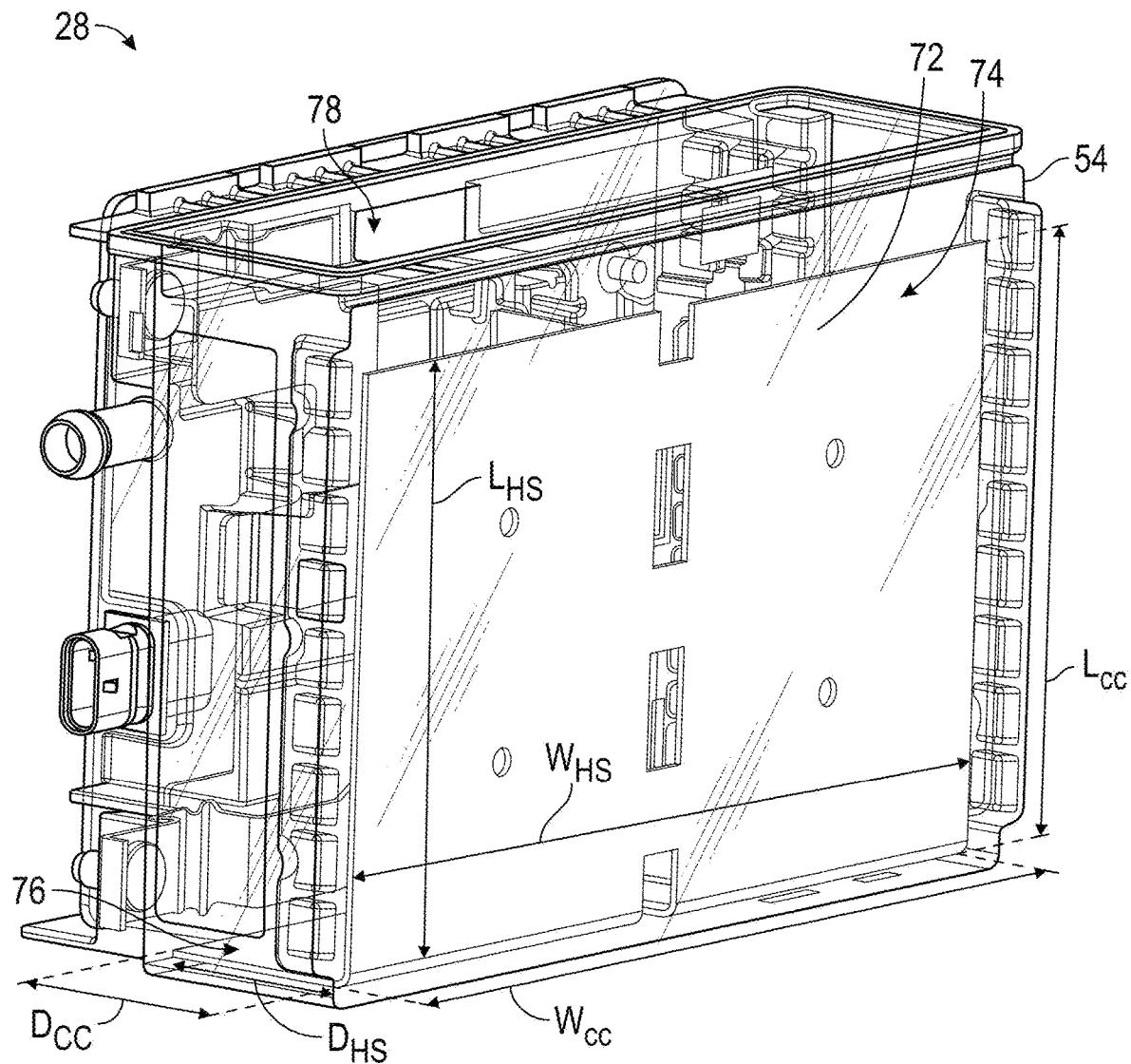
FIG. 6 is a second perspective see-through view of the thermal management system of FIG. 4.

As shown in the partial see-through perspective view of FIG. 6, the heat sink 72 may have an L-shape and may have a size and geometry that corresponds to the cell compartment 78 of the housing 54. In particular, in the illustration of FIG. 6, the first portion 74 of the heat sink 72 may have a length LHS that is substantially the same as the length of the cell compartment LCC, and a width WHS that is substantially the same as the width of the cell compartment WCC. Further, a depth DHS of the heat sink 72 may be substantially the same as the depth DCC of the cell compartment 78.

Figure 7:
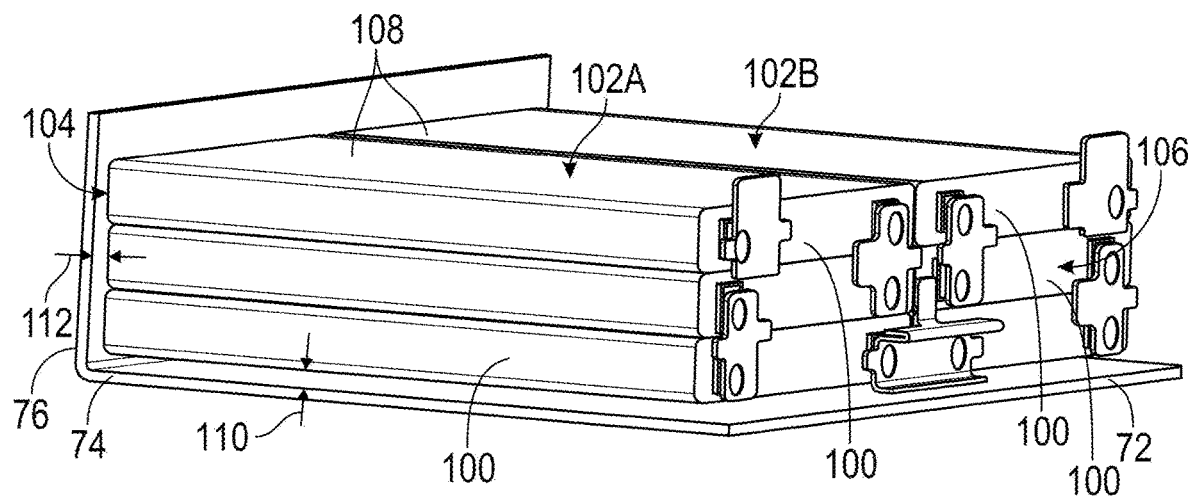
FIG. 7 is a partial perspective view of the heat sink of FIG. 5 positioned adjacent to a pair of battery cell stacks.

As shown in FIG. 7, which is a cutaway perspective view of the heat sink 72 and a plurality of battery cells 100, this sizing of the heat sink 72 may ensure that certain surfaces of the battery cells 100 are allowed to readily transfer heat to the heat sink 72. For example and as shown, the plurality of battery cells 100 is arranged in a pair of adjacent battery cell stacks 102A, 102B. The heat sink 72 is configured such that the second portion 76 is oriented substantially parallel to a base end 104 of each battery cell of the plurality of battery cells 100. The first portion 74 extends from the second portion 76 at the base end 104, and in a direction generally toward a terminal end 106 of each battery cell of the plurality of battery cells 100. In this way, the first portion 74 extends in a direction along a face 108 of the battery cells of the adjacent stacks of battery cells 102. It is presently recognized that additional thermal energy can be drawn away from the battery cells 100 in constructions where the heat sink 72 extends along the base end 104 and the faces 108 of the battery cells 100. It should be noted that in certain implementations, there is no direct thermal contact between the heat sink 72 and the battery cells 100 (e.g., their casings/housings), as the housing 54 causes a gap 110 to be formed between the face 108 of the stacks 102 and the first portion 74 and a gap 112 to be formed between the base end 104 of the stacks 102 and the second portion 76.

Figure 8:
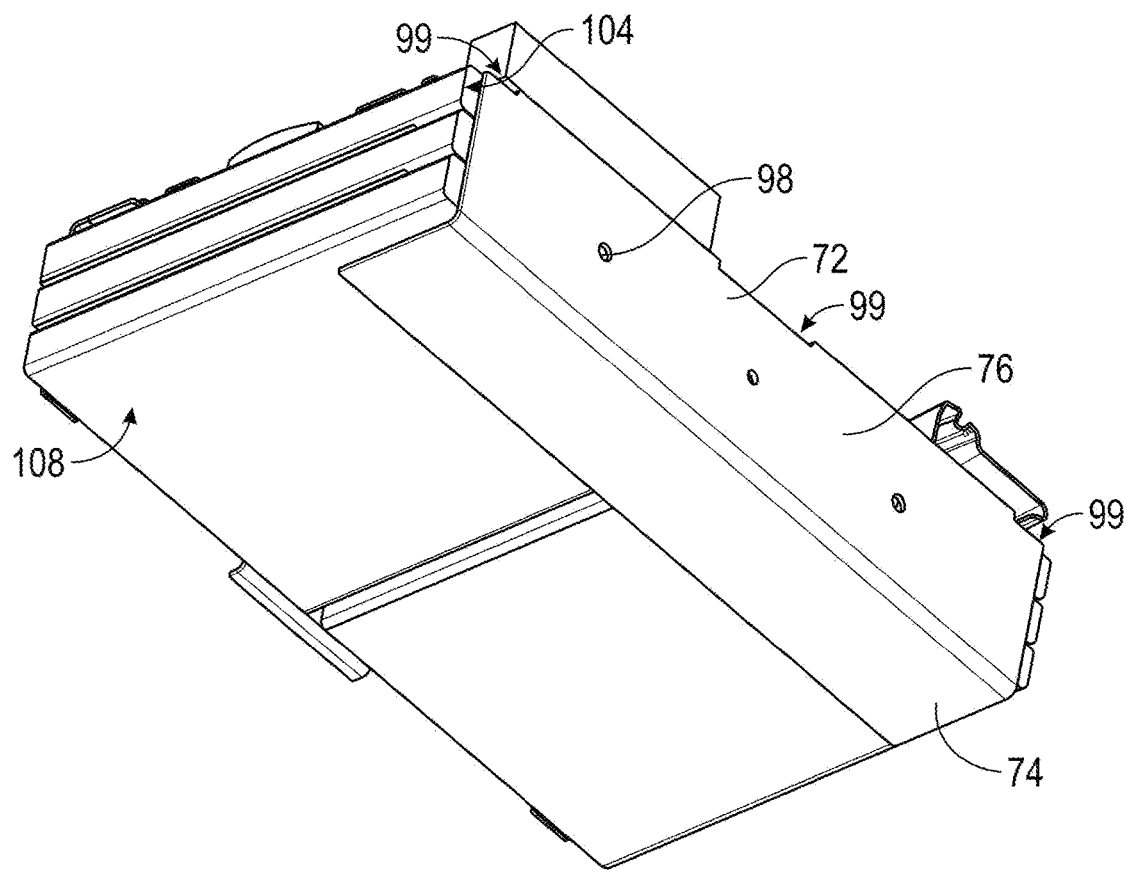
FIG. 8 is a partial perspective view of a second heat sink having a shorter length than the heat sink of FIG. 7.

The heat sink 72 may have other configurations and sizes. For example, as shown in the perspective view of FIG. 8, the heat sink 72 may not extend the entire length LCC of the cell compartment 78. Rather, in the illustration of FIG. 8, the heat sink 72 has the first portion 74 extending only a portion (e.g., 25%) of the length LCC of the cell compartment 78. Indeed, the first portion 74 may have a number of different configurations. For instance, the first portion 74 may extend between 10% and 100% of the length LCC of the cell compartment 78, such as about 25%, about 50%, about 75% or about 100% length LCC of the cell compartment 78. As also shown in FIG. 8, the first portion 72 and the second portion 76 may not necessarily have the different cell sections 92, 94, but may instead be continuous (e.g., unbroken) structures that only include minor irregularities or minor features (e.g., holes 98) for manufacturing purposes. Other minor irregularities that can help with manufacturing include indentations 99.

Figure 9:
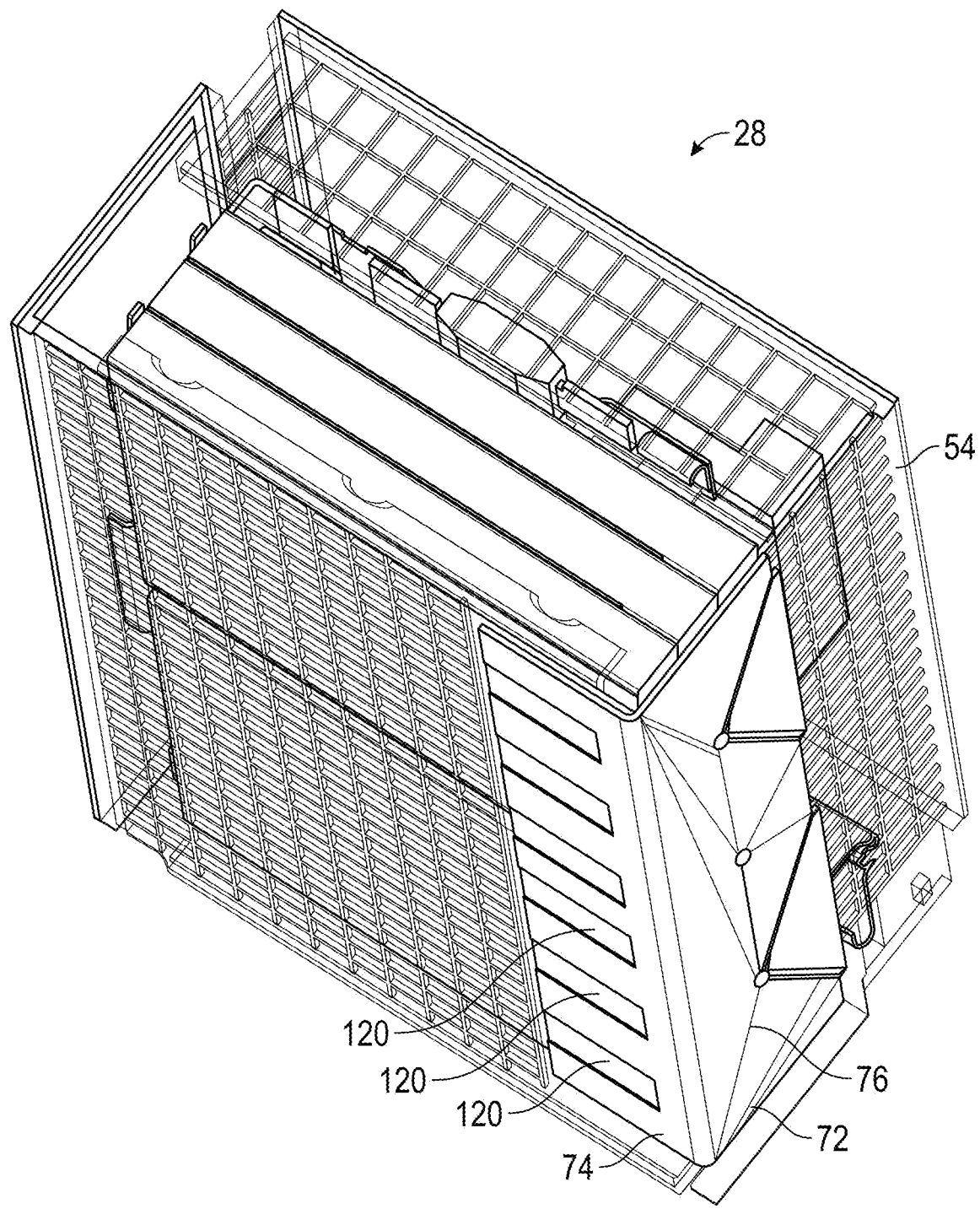
FIG. 9 is a perspective see-through view of the second heat sink of FIG. 8 having a plurality of fingers.

In still further constructions, as shown in the perspective view of FIG. 9, the heat sink 72 may have other geometrical features. In the illustration of FIG. 9, the first portion 74 of the heat sink 72 includes fingers 120, which may facilitate heat transfer between the housing 54 and the heat sink 72. Further, while shown in a quarter-length configuration, the fingers 120 may be longer in other constructions, such as when the first portion 74 extends 50% of LCC (a half-length configuration), 75% of LCC (a three-quarters length configuration), or 100% of LCC (a full-length configuration).

Figure 10:
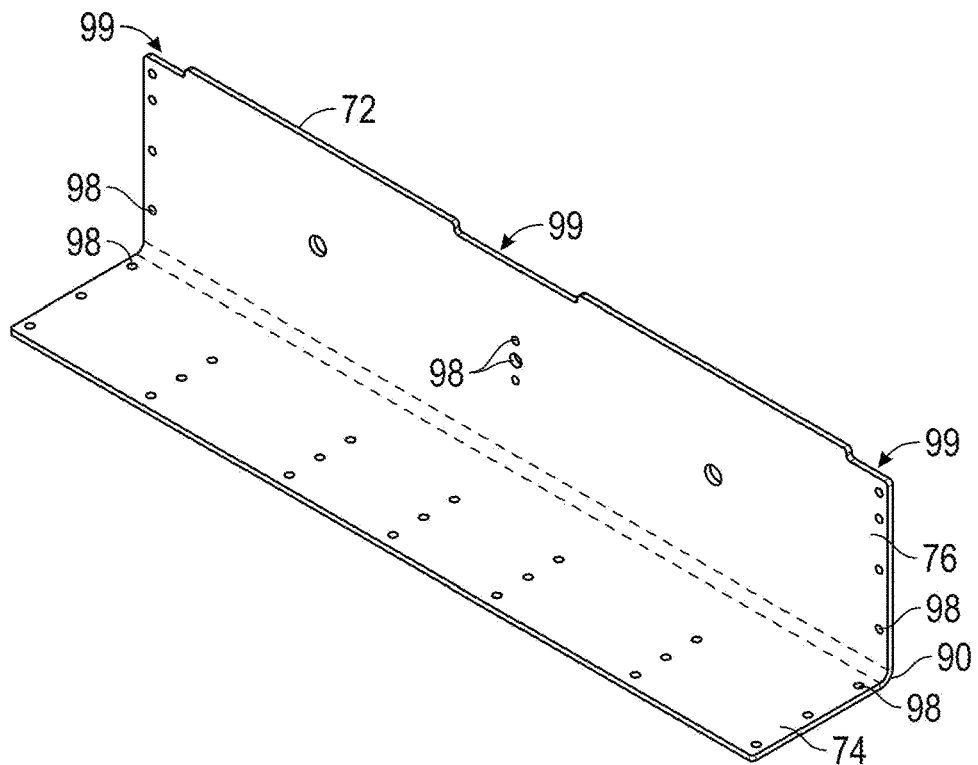
FIG. 10 is a perspective view of a third heat sink capable of being used in the battery module of FIG. 3.
Figure 11:
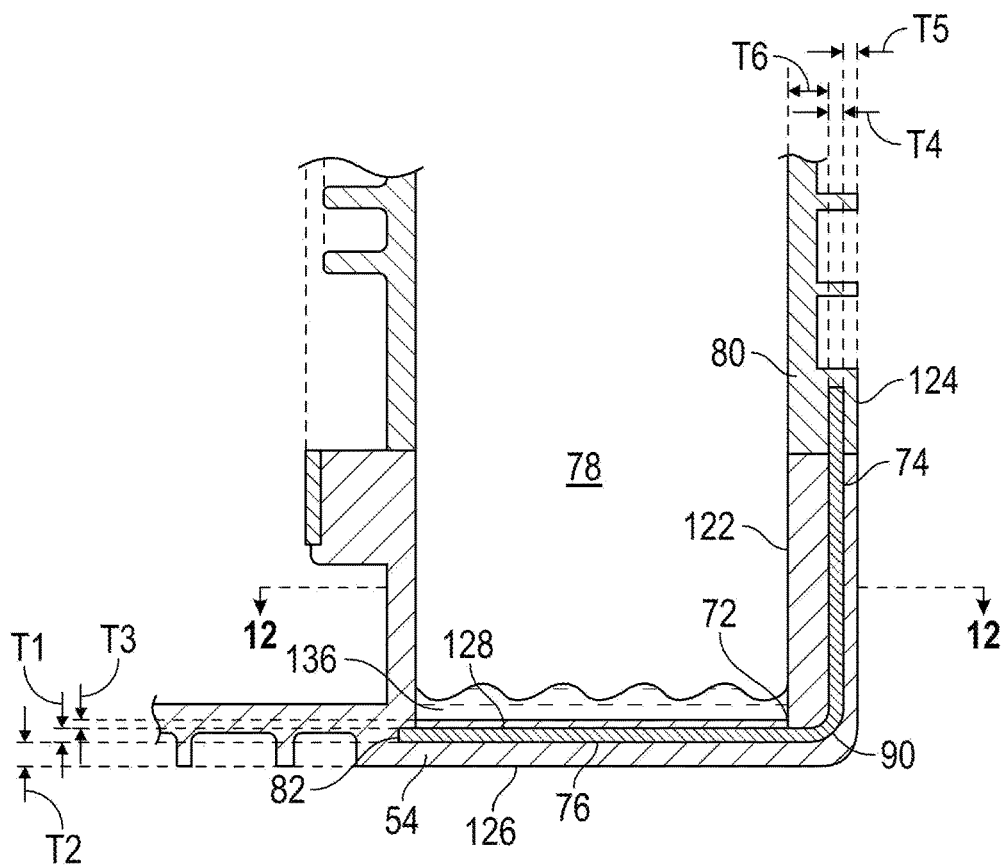
FIG. 11 is a partial sectional view a thermal management system capable of being used in the battery module of FIG. 3, the thermal management system including the heat sink of FIG. 10.
Figure 12:
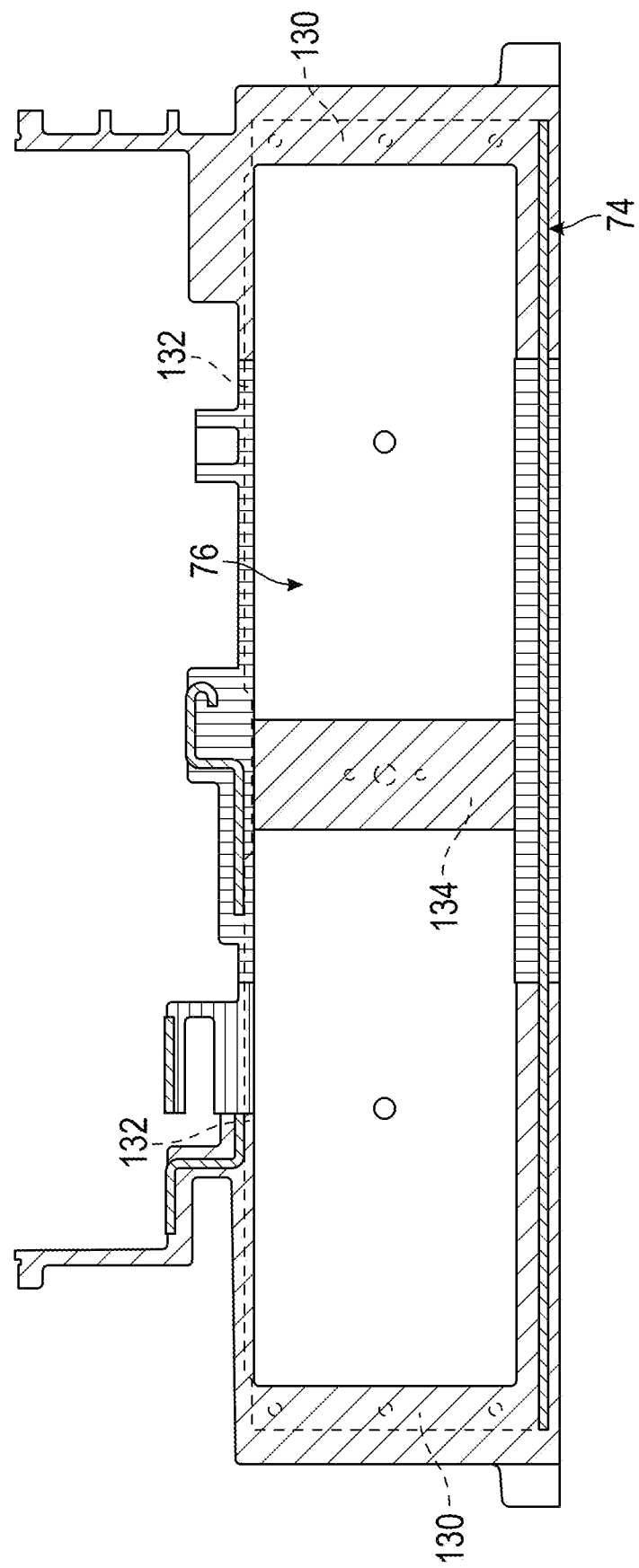
FIG. 12 a plan view of a portion of the thermal energy management system along line 12-12' in FIG. 11.

Another construction of a heat sink 72 and portions of a thermal energy management system 70 are shown in FIGS. 10-12. Like the construction shown in FIG. 8, the heat sink 72 of FIGS. 10-12 does not extend the entire length LCC of the cell compartment 78. Rather, the heat sink 72 has the first portion 74 extending only approximately 15-35% of the length LCC of the cell compartment 78. The heat sink 72 may also include a plurality of holes 98 and indentations 99 to facilitate attachment of the heat sink 72 to a material of the housing 54 during manufacturing.

Similar to the previously discussed constructions, the heat sink 72 may be constructed from an appropriate material that has a thermal conductivity higher than the material forming the battery module housing 54. By way of non-limiting example, the heat sink 72 may be formed from aluminum, steel, and so forth, and the battery module housing 54 may be formed from a polymer or polymer composite, such as a polyolefin (e.g., polypropylene) or polyolefin composite, or any suitable polymeric material (e.g., polymer mixtures).

As shown in FIG. 11, the heat sink 72 is substantially over molded by the battery module housing 54. That is, the heat sink 72 has no surfaces that are exposed to the external environment surrounding the battery module housing 54, and limited surfaces that are exposed to the internal environment enclosed by the battery module housing 54. Indeed, for the construction shown in FIG. 11, first portion 74 of the heat sink 72 is completely embedded within a first wall 80 of the housing 54. That is, the first portion 74 is not exposed through either an interior side 122 or an exterior side 124 of the first wall 80. The second portion 76 of the heat sink 72, on the other hand, is partially embedded within a second wall 82 of the housing 54. More specifically, the second portion 76 is not exposed through an exterior side 128 of the second wall 82; however, some of the second portion 76 (discussed more below with FIG. 12) is exposed to an interior side 126 of the second wall 82.

Also shown in FIG. 11, the thickness of the first and second walls 80 and 82 can vary, the thickness of the heat sink 72 can vary, and the placement of the heat sink 72 within the first and second walls 80 and 82 can vary. For the shown construction, the second portion 76 of the heat sink 72 is placed closer to the interior side 126 of the battery module housing 54 to the exterior side. That is, the thickness T1 corresponds to the thickness of the second portion 76 of the heatsink 72, the thickness T2 corresponds to the thickness of the material between the second portion 76 of the heatsink 72 and the exterior side 126 of the wall 82, and the thickness T3 corresponds to the thickness of the material between the second portion 76 of the heatsink 72 and the interior side 128 of the wall 82. The thickness T2 is substantially greater than the thickness T3. In one construction, the second portion 76 of the heatsink 72 is completely exposed to the interior side of the housing (i.e., T3 is zero). This allows the most amount of heat to transfer from the batteries cells 100 to the heat sink 72. However, to promote manufacturing and stability of the housing 54, some portion of the wall 82 is molded on the interior side of the heat sink. This is best shown with FIGS. 11 and 12.

As best shown in FIG. 12, the second portion 76 of the heat sink 72 is partially exposed to the interior of the of the battery module housing 54. However, part of the second portion 76 is also embedded within the battery module housing 54. For example, edges 130, tabs 132, and median 134 are embedded within the battery module housing 54.

Referring again to FIGS. 11 and 12, a thermal epoxy 136 is used to adhere the casings of the battery cells 100 to the exposed surfaces 138 of the heat sink 72. The thermal epoxy 136 helps reduce electrical shorting, particularly when the heat sink indented, and helps with battery cell 100 placement. An example thermal epoxy is shown and described in US Patent Application Publication No. 2016/0301046, entitled "Thermal Epoxy and Positioning of Electrochemical Cells," the content of which is incorporated herein by reference.

In one implementation, the thermal epoxy 136 has aluminum-to-aluminum adhesion and is positioned between the heat sink 72 and the bottom of the battery cells 100 in the stack. The thermal epoxy 136 has thermal conductivity, adhesion, and viscosity requirements to be appropriate for this particular system. For example, in one embodiment, the epoxy thermal conductivity is a minimum of 0.77 W/m-K (Watts per meter-Kelvin), and the epoxy adhesion is a minimum of 0.588 N/mm$^2$. The thermal epoxy 136 can be binary, meaning that the epoxy cures (hardens) over time when a first component and a second component are mixed together. However, the viscosity, even before curing is completed, is still relatively high (e.g., between 100,000 centipoise and 300,000 centipoise). In some implementations, the curing can be accelerated by heating. In further implementations, the thermal epoxy 136 may be UV-curable Referring again to FIG. 11, the first portion 74 of the heat sink 72 is located closer to the exterior side 124 of the first wall 80. That is, the thickness T4 corresponds to the thickness of the first portion 74 of the heatsink 72, the thickness T5 corresponds to the thickness of the material between the second portion 74 of the heatsink 72 and the exterior side 122 of the wall 80, and the thickness T6 corresponds to the thickness of the material between the second portion 74 of the heatsink 72 and the interior side 124 of the wall 80. The thickness T6 is greater than the thickness T2. The thickness T5 being less than thickness T6 allows for more heat to exit from the battery module housing 54 than return into the battery module housing 54.

One or more of the disclosed embodiments, alone or in combination, may provide one or more technical effects including enhancing thermal energy dissipation from a battery module housing. In one implementation, a battery module housing includes a heat sink completely embedded within the housing. The embedded heat sink allows the battery module housing to more efficiently absorb thermal energy from battery cells contained in the housing. Further, the configuration of the heat sink, such as an L-shaped configuration, may allow for even dissipation of the thermal energy away from the battery cells, which allows the battery cells in the housing to remain at a substantially similar temperature. By maintaining a substantially similar temperature, the battery cells may operate in substantially the same way, and age at substantially the same rate, allowing for a longer lifetime of the battery and more efficient operation. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:

1. A battery system, comprising:
a housing configured to receive a plurality of battery cells arranged in adjacent cell stacks that are configured to generate thermal energy, the housing comprising a first wall and a second wall, both of which are positioned proximate to the plurality of battery cells, and a first thickness and a second thickness with the second thickness being greater than the first thickness, the first wall and the second wall forming in part a cell compartment; and
a unitary heat sink comprising:
a first portion embedded into the first wall and a second portion embedded into the second wall, the first portion being completely embedded into the first wall and the second portion being partially embedded into the second wall;
the first portion comprising a first surface on a first side of the first portion and a second surface on a second opposite side of the first portion, with the first thickness between the first surface and an exterior surface of the first wall and the second thickness between the second surface and an interior surface of the first wall;

a first cell section corresponding to one of the cell stacks and a second cell section corresponding to another of the cell stacks; and a plurality of bridges extending between the first cell section and the second cell section.

2. The battery system according to claim 1, wherein the first and second walls are positioned orthogonally to one another, and wherein the unitary heat sink has an L-shape.

3. The battery system according to claim 1, wherein the cell compartment has a length, and wherein the first portion spans between 10% and 100% of the length of the cell compartment.

4. The battery system according to claim 1, wherein the first portion and the second portion are positioned orthogonal to one another, and wherein the unitary heat sink further comprises a transition region positioned between the first portion and the second portion, the transition region being defined by a curved surface.

5. The battery system of claim 1, wherein the second portion includes a partially exposed surface to the cell compartment.

6. The battery system of claim 5, further comprising a thermal epoxy fixedly coupling the battery cell to the partially exposed surface.

7. The battery system according to claim 1, wherein the second portion of the unitary heat sink comprises a first surface on a first side of the second portion and a second surface on a second opposite side of the second portion, wherein the housing has a first thickness between the first surface and an exterior surface of the first wall and the housing has a second thickness between the second surface and an interior surface of the first wall, wherein the first thickness is greater than the second thickness.

8. The battery system according to claim 1, wherein the housing comprises a first material, wherein the unitary heat sink comprises a second material having a thermal conductivity higher than the first material.

9. The battery system of claim 8, wherein the first material comprises a polymer or polymer composite, and wherein the second material comprises a metal.

10. A battery system, comprising:
a plurality of battery cells that are configured to generate thermal energy;
a housing for the plurality of battery cells, the housing comprising a first wall and a second wall positioned orthogonally to one another and proximate to the plurality of battery cells, the first wall and the second wall forming in part a cell compartment;
a unitary heat sink comprising:
a first portion and a second portion, the first portion being completely embedded into the first wall, and the second portion being partially embedded into the second wall and including a partially exposed surface to the cell compartment; and
a first surface on a first side of the first portion and a second surface on a second opposite side of the first portion, the housing having a first thickness between the first surface and an exterior surface of the first wall and the housing having a second thickness between the second surface and an interior surface of the first wall, the second thickness being greater than the first thickness; and
a thermal epoxy fixedly coupling the plurality of battery cells to the partially exposed surface.

11. The battery system of claim 10, wherein the second portion of the unitary heat sink comprises a first surface on a first side of the second portion and a second surface on a second opposite side of the second portion, wherein the housing has a first thickness between the first surface and an exterior surface of the first wall and the housing has a second thickness between the second surface and an interior surface of the first wall, wherein the first thickness is greater than the second thickness.

12. The battery system of claim 10, wherein the second portion of the unitary heat sink comprises a first surface on a first side of the second portion and a second surface on a second opposite side of the second portion, wherein the housing has a first thickness between the first surface and an exterior surface of the first wall and the housing has a second thickness between the second surface and an interior surface of the first wall, wherein the first thickness is greater than the second thickness.

13. The battery system according to claim 10, wherein the housing comprises a first material, wherein the unitary heat sink comprises a second material having a thermal conductivity higher than the first material.

14. The battery system of claim 13, wherein the first material comprises a polymer or polymer composite, and wherein the second material comprises a metal.

15. The battery system according to claim 10, wherein the first portion and the second portion are positioned orthogonal to one another, and wherein the unitary heat sink further comprises a transition region positioned between the first portion and the second portion, the transition region being defined by a curved surface.

* * * * *